Nov. 3, 1959     S. CONVERSE     2,911,157
LAWN SPRAYING DEVICE
Filed Sept. 14, 1956
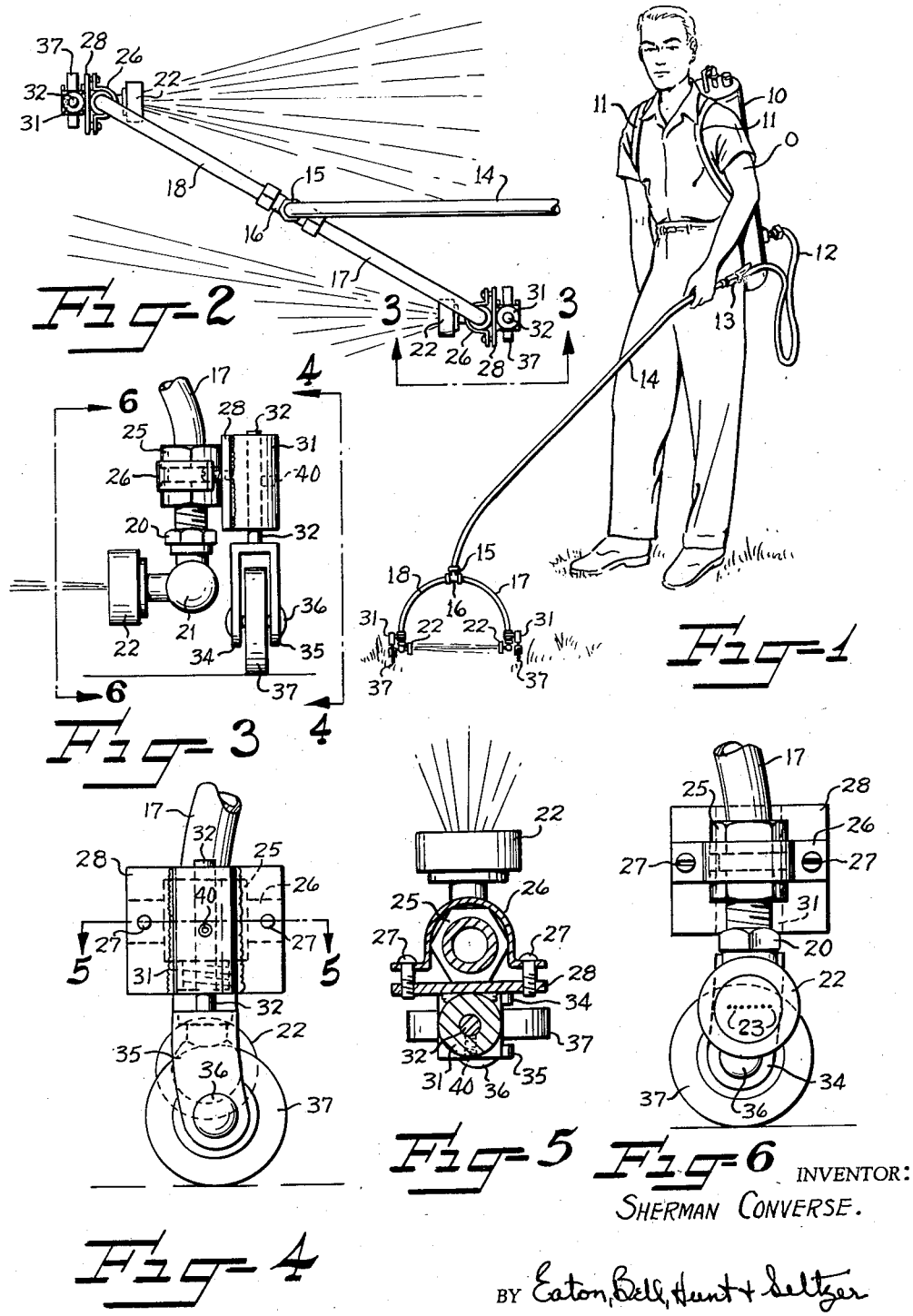
INVENTOR:
SHERMAN CONVERSE.
BY Eaton, Bell, Hunt & Seltzer
ATTORNEYS.

2,911,157

LAWN SPRAYING DEVICE

Sherman Converse, Graniteville, S.C.

Application September 14, 1956, Serial No. 609,953

7 Claims. (Cl. 239—287)

This invention relates to a paint spraying apparatus and more especially to a paint spraying apparatus adapted to paint a lawn when the same has become brown in the fall of the year. Heretofore great amounts of money have been spent in sowing the yarns in the fall of the year with rye grass and other green vegetation whereby the lawn will give a green appearance throughout the winter. It has been found that ordinary grass which turns brown in the fall of the year can be painted or dyed a suitable color such as grass green and it will look like a green lawn when as a matter of fact the grass has dried up or turned brown and would not present a pleasing appearance if its actual color were visible.

It is an object of this invention to provide a spraying apparatus having a pair of adjustable oppositely directed spray nozzles or heads which spray in the same plane and parallel to each other or in alinement with each other and which spray mechanism is adapted to be mounted on wheels if desired with the wheels being vertically adjustable so that the spray can be adjusted at the proper height with respect to the grass to be painted. Also, the two spray heads are adjustable to be directed toward each other or in opposite directions in the same horizontal plane and will not only spray the upper surfaces of the grass but also the underside of the grass and thus present a natural green appearance as would be the appearance of growing grass.

It is another object of this invention to provide two or more oppositely directed and vertically adjustable spray heads which can be moved over a lawn and can be supplied with a suitable paint or dye under pressure through a hollow handle and said hollow handle being preferably directed in a sidewise manner so the operator can apply the paint without walking over any portion of the paint in his application thereof. This allows the paint to dry smoothly and evenly and allows the lawn to be completed by back and forth movement without the operator ever walking on the freshly applied paint.

Some of the objects of the invention having been stated, other objects will appear as the description proceeds when taken in connection with the accompanying drawings, in which—

Figure 1 is a front elevation showing the spraying apparatus in use by an operator with the spray nozzles being opposed and in alinement with each other;

Figure 2 is a top plan view on an enlarged scale of the front portion of the apparatus with the operator being omitted and showing how the handle can be adjusted in a sidewise direction to any desired angle and showing the spray nozzles disposed substantially parallel to each other;

Figure 3 is an enlarged fragmentary front elevation taken along the line 3—3 in Figure 2;

Figure 4 is a side elevational view taken along the line 4—4 in Figure 3;

Figure 5 is a horizontal cross sectional view taken along the line 5—5 in Figure 4;

Figure 6 is a side elevational view taken along the line 6—6 in Figure 3 and looking in an opposite direction from Figure 4.

Referring more specifically to the drawings, the reference character O indicates an operator carrying a fluid or paint supply pressure tank 10 by means of suitable shoulder straps 11. The tank has connected thereto one end of an outlet hose 12 which has its other end connected to one end of a hand operated valve 13. The other end of the valve 13 is connected to the upper end of a tubular pipe or hollow handle 14 which is adapted to be engaged by the hand of the operator to manipulate the device. The lower end of the pipe 14 is connected by a union 15 to a T member 16 and by loosening and adjusting the union 15, the angle of the pipe 14 with relation to the spraying apparatus can be adjusted.

The handle 14 is preferably adjusted to extend sidewise so that the operator can spray a lawn by walking on the un-sprayed portion. However, if desired, the handle 14 may be adjusted to extend at right angles, in which event the spraying apparatus may be pulled or pushed if desired.

From each side of the T 16 projects outwardly and downwardly extending curved pipes 17 and 18 which are threaded on their lower ends to receive a ball and socket paint nozzle union indicated at 20. This ball and socket paint nozzle has a ball and socket member 21 in which is connected a spray nozzle or head 22 which can be adjusted in any desired position.

Each of the pipes 17 and 18 have a pipe fitting 25 secured thereon in any suitable manner such as by flaring the ends of the pipes. Each of the pipe fittings 25 is adapted to receive a U-shaped adjusting clip 26 which is secured by means of screws or bolts 27 to a vertically disposed plate 28 on the outer side of the apparatus. Each of the plate members 28 has suitably secured thereto as by welding a wheel supporting sleeve 31 which has a vertically disposed bore therein for receiving an uprising shank 32 of a wheel holder having a bifurcated or forked portion comprising flange members 34 and 35 integral with each other at their upper ends and their lower ends are penetrated by a bolt 36 serving as an axle for rotatably securing a wheel 37 therein.

The sleeve 31 has a set screw 40 therein by means of which the shank 32 can be adjusted vertically, to regulate the height of the paint nozzles 22 above the ground or grass. The height of the paint spray members 22 can also be adjusted by means of the clip 26 being loosened by unscrewing the bolts 27 and vertically adjusting the clip 26 relative to the pipe fitting 25. It is apparent that vertical movement of the clip 26 moves the sleeve member 31 and wheel secured thereto.

Since both sides of the pipe members 17 and 18 and the wheel arrangement and nozzle thereof are the same, like reference characters will apply to both sides of the apparatus.

If desired, the apparatus can be adjusted to the position shown in Figure 1 wherein the nozzles 22 are diametrically opposed to each other and cast their sprays in a direction towards each other. This allows the paint to not only cover the underside or side portions of the grass but also the upper surfaces thereof. So it is seen that the nozzles 22 by being diametrically opposed to each other will spray all sides and top portions of the grass and make it appear in a natural condition.

Instead of having the handle 14 adjusted to project backwardly and rearwardly in a sidewise manner as shown in Figure 1, the handle 14 can be adjusted to approximately right angles to the path of travel of the machine as shown in Figure 2 and the operator can walk along on the untreated grass and spray a strip thereof by pushing or pulling the apparatus as desired. In other words, the handle member 14 can be adjusted to any suitable angle by means of loosening and tightening the union 15.

The nozzles 22 each are provided with a plurality of openings 23 through which the spray passes and it will be seen that these sprays are oppositely directed and preferably go all the way across the path of travel of the apparatus so that the grass will be sprayed on both sides of same as there will be no blades of grass which will not be completely sprayed on both sides to thoroughly cover the same.

It will be noted that in Figure 2 where the handle 14 is attached sidewise that the wheels 37 are shown in straight position. Of course, it is evident that with the operator walking behind the apparatus as is shown in Figures 1 and 2, the wheels would have to be adjusted sidewise to cause the spraying apparatus to run in a straight line parallel to the portions being painted or sprayed and this would be done by loosening the set screw 40 and turning the portion 32 and attaching it to a new position. Also the bolts 27 could be loosened and the wheels could be adjusted to a different angle or position from that position shown. It will be observed that in the position shown in Figure 1, the wheels are fixed at right angles to the plane of pipes 17 and 18.

When it is desired to operate the apparatus in the arrangement shown in Figure 2, it is not absolutely necessary to change the position of the handle 14 with relation to pipes 17 and 18 but it is necessary to change the angle of the wheels with respect to the plane of the pipes. It is, of course, also necessary to adjust the spray nozzles so that the direction of the spray is at right angles to the direction of travel, just as it is in Figure 1. The difference between the two positions shown in Figures 1 and 2 is that in Figure 1 the spray nozzles are diametrically opposed to each other and are spraying the same area of grass from opposite directions at the same time. In the position shown by Figure 2 the grass is sprayed from one direction by the spray from the forward nozzle and as the apparatus moves forward this same grass area is sprayed from the opposite direction by the other nozzle.

Another point which should be borne in mind is that while any type of spray nozzle can be used, the preferred type is that which gives a fan shaped spray with the nozzles adjusted so that the plane of the fan shaped spray is parallel to the ground.

Although I have described the apparatus as being equipped with wheels it is quite evident that since the sprayer would more than likely be made of light aluminum metal that the whole assembly comprising the clips 26, plates 28, sleeves 31 and the wheels 37 could be dispensed with and the apparatus could if desired be used without wheels.

It is thus seen that I have provided a paint spraying apparatus for painting grass in the fall of the year which will cause it to have a green appearance for an extended length of time and in case the paint should not last all winter, the lawn can be retreated to thus provide the appearance of green grass throughout the winter without the necessity of sowing a winter grass such as rye grass and the like.

In the drawings and specification there has been set forth a preferred embodiment of the invention and although specific terms are set forth, they are used in a descriptive and generic sense only and not for purposes of limitation, the scope of the invention being defined in the claims.

I claim:

1. A spraying apparatus comprising a pressure tank adapted to contain a fluid to be sprayed, a hollow handle member communicatively connected to said tank, a valve for controlling the flow of fluid through said handle member, a T member rotatably and adjustably secured to the lower end of said handle member, oppositely diverging and downwardly extending hollow tubular members connected to opposite sides of said T member, an adjustable horizontally disposed spray nozzle communicatively connected to the lower ends of each of said downwardly extending hollow tubular members, wheel supporting means adjustably secured to the lower ends of each of said downwardly extending hollow tubular members, said wheel supporting means comprising a U-shaped clip member surrounding the inner and lower portion of each of said downwardly extending hollow tubular members, bolts penetrating the opposite ends of said U-shaped clip member, a vertically arranged plate positioned on the outer side of said downwardly extending hollow tubular members, said bolts being threadably secured to said plate member, a vertically arranged sleeve member suitably secured to said plate member, a wheel assembly having a shank portion penetrating said sleeve member, and means for securing the shank portion of the wheel assembly in said sleeve member in the desired vertical position for controlling the height of the spray nozzles with respect to the surface to be sprayed.

2. A spraying apparatus comprising a pressure tank adapted to contain a spray fluid, a hollow handle member communicatively connected to the fluid in said pressure tank, a valve for controlling the emission of fluid through said hollow handle member, a T member rotatably and adjustably secured to the lower end of said handle member, curved hollow members extending downwardly from opposite sides of said T member and being communicatively connected thereto for permitting the fluid to pass therethrough, a horizontally disposed and horizontally and vertically adjustable spraying nozzle communicatively connected to the lower end portion of each of said curved hollow members, wheels connected to the lower portion of said curved hollow members and normally extending in a lower horizontal plane than said spraying nozzles and means adjustably connecting said wheels to said curved hollow members for vertically adjusting said wheels to vary the height of the spraying nozzles with respect to the surface to be sprayed.

3. A spraying apparatus according to claim 2 wherein said means for vertically adjusting said wheels comprises a U-shaped clip surrounding the inner end portion of each of said curved hollow members, a vertically arranged sleeve member connected to each of said wheels and bolts connecting inner ends of said U-shaped clip member to each of said sleeves whereby upon desiring to change the elevation of said nozzles with respect to the surface to be painted, only the bolts need be loosened and the clip vertically adjusted on the lower portion of each of said curved hollow member and subsequently retightened at the desired position.

4. A spraying apparatus comprising a pressure tank adapted to contain a fluid therein, a hollow handle communicatively connected to the fluid in the tank, a valve connected to said hollow handle for controlling the flow of fluid therethrough, oppositely diverging and downwardly extending curved hollow members communicatively connected to the lower end of said handle, means adjustably connecting the handle to said curved hollow members to permit the handle to be disposed at any desired angle in relation to said curved hollow members, a horizontally disposed and vertically and horizontally adjustable spray nozzle secured to the lower end of each of said curved hollow members and communicating therewith to permit fluid to pass therethrough, wheels normally extending downwardly below said nozzles and means for adjustably connecting said wheels to the lower portion of said curved hollow members for vertically adjusting said wheels to vary the height of the spraying nozzles with respect to the surface to be sprayed.

5. A spraying apparatus according to claim 4 wherein said means for adjustably connecting said wheels to the curved hollow members includes means for preventing the wheels from swiveling to thus permit the spraying apparatus to be freely moved in a straight path of travel.

6. A spraying apparatus according to claim 4 wherein said means for adjustably connecting said wheels to the lower end portion of said curved hollow members for vertically adjusting the same comprises a U-shaped clip surrounding the inner surface of the lower end portions of each of said curved hollow members, a vertically arranged sleeve connected to each of said wheels for preventing the same from swiveling and bolts adjustably connecting the opposed ends of each of said clips to said sleeves whereby upon desiring to change the position of said wheels with respect to said nozzles the bolts are loosened and the clips moved vertically and subsequentyy retightened at the desired position.

7. A spraying apparatus comprising a pressure tank adapted to contain a fluid to be sprayed, a hollow handle member communicatively connected to said tank, a valve for controlling the flow of fluid through said handle member, a T member rotatably and adjustably secured to the lower end of said handle member, oppositely diverging and downwardly extending hollow tubular members connected to opposite sides of said T member, horizontally disposed and vertically and horizontally adjustable spray nozzles communicatively connected to the lower ends of said downwardly extending hollow tubular members, wheel supporting means adjustably secured to the lower ends of each of said downwardly extending hollow tubular members, said wheel supporting means comprising a U-shaped clip member surrounding the inner and lower portion of each of said downwardly extending hollow tubular members, bolts penetrating the opposite ends of said U-shaped clip member, a vertically arranged plate positioned on the outer side of said downwardly extending hollow tubular members, said bolts being threadably secured to said plate member, a vertically arranged sleeve member suitably secured to said plate member, a wheel assembly having a shank portion penetrating said sleeve member, and a set screw for securing the shank portion of the wheel assembly in the desired vertical position for controlling the height of the spray nozzles with respect to the surface to be sprayed.

References Cited in the file of this patent

UNITED STATES PATENTS

| | | |
|---|---|---|
| 676,204 | Rippley | June 11, 1901 |
| 1,589,351 | Blaw | June 22, 1926 |
| 1,943,655 | Cummings | Jan. 16, 1934 |
| 2,518,771 | Gol | Aug. 15, 1950 |
| 2,661,982 | Hudson | Dec. 8, 1953 |
| 2,692,163 | Geel | Oct. 19, 1954 |
| 2,712,960 | Grubb | July 12, 1955 |
| 2,784,030 | Dietzel | Mar. 5, 1957 |

FOREIGN PATENTS

| | | |
|---|---|---|
| 387,100 | Germany | Oct. 28, 1922 |